Oct. 10, 1967     A. T. C. BURROWS     3,345,833
DRIVE TRANSMITTING MECHANISMS
Filed Sept. 17, 1965                    2 Sheets-Sheet 2

United States Patent Office 3,345,833
Patented Oct. 10, 1967

3,345,833
DRIVE TRANSMITTING MECHANISMS
Arthur Thomas Charles Burrows, Stevenage, England, assignor to Geo. W. King Limited, Stevenage, England, a company of Great Britain
Filed Sept. 17, 1965, Ser. No. 488,081
5 Claims. (Cl. 64—30)

ABSTRACT OF THE DISCLOSURE

A frictional clutch transmission mechanism between driving and driven shafts wherein the degree of frictional engagement is lessened during acceleration and retardation by providing an angularly displaceable camming member interposed between two cage elements, the cage elements operatively carrying axially movable friction gripping members and being rotatably keyed to one shaft, whereby angular displacement of the camming member forces the cage elements and friction gripping members apart and lessens the degree of frictional engagement on a disc secured to the other shaft and interposed between gripping members.

This invention relates to drive transmitting mechanisms and is concerned more particularly although not necessarily execlusively with such mechanisms as are employed for traversing hoists, cranes or the like.

It is the chief object of the invention to provide means for incorporation in drive units employed for imparting traverse motion to pulley blocks, cranes or the like which means will be effective to ensure smooth acceleration and retardation under all conditions of operation and thereby substantially to eliminate or materially to decrease load swing or sway.

According to the invention there is interposed between aligned driving and driven shafts a transmission mechanism comprising a disc secured to one of the shafts to rotate therewith, a friction gripping member at each of the opposed faces of the disc, a cage element attached to each of said friction gripping members said cage elements being so supported that while being rotatable with the other shaft they will be movable axially relatively thereto and to each other, resilient means urging said cage elements relatively inwardly or towards each other so that the friction gripping members will be maintained in frictional engagement with the disc and means interposed between said cage elements and effective as a result of relative angular movement between the two aligned shafts to exert on said cage elements a force opposed to that exerted by the resilient means thereby to vary the degree of frictional engagement between said friction gripping members and said disc the arrangement being such that slippage of the clutch will occur when the torque between the driving and driven shafts exceeds a predetermined value, whereby smooth acceleration and retardation of said driven shaft will be obtained on starting and stopping of the driving shaft.

Figure 1:
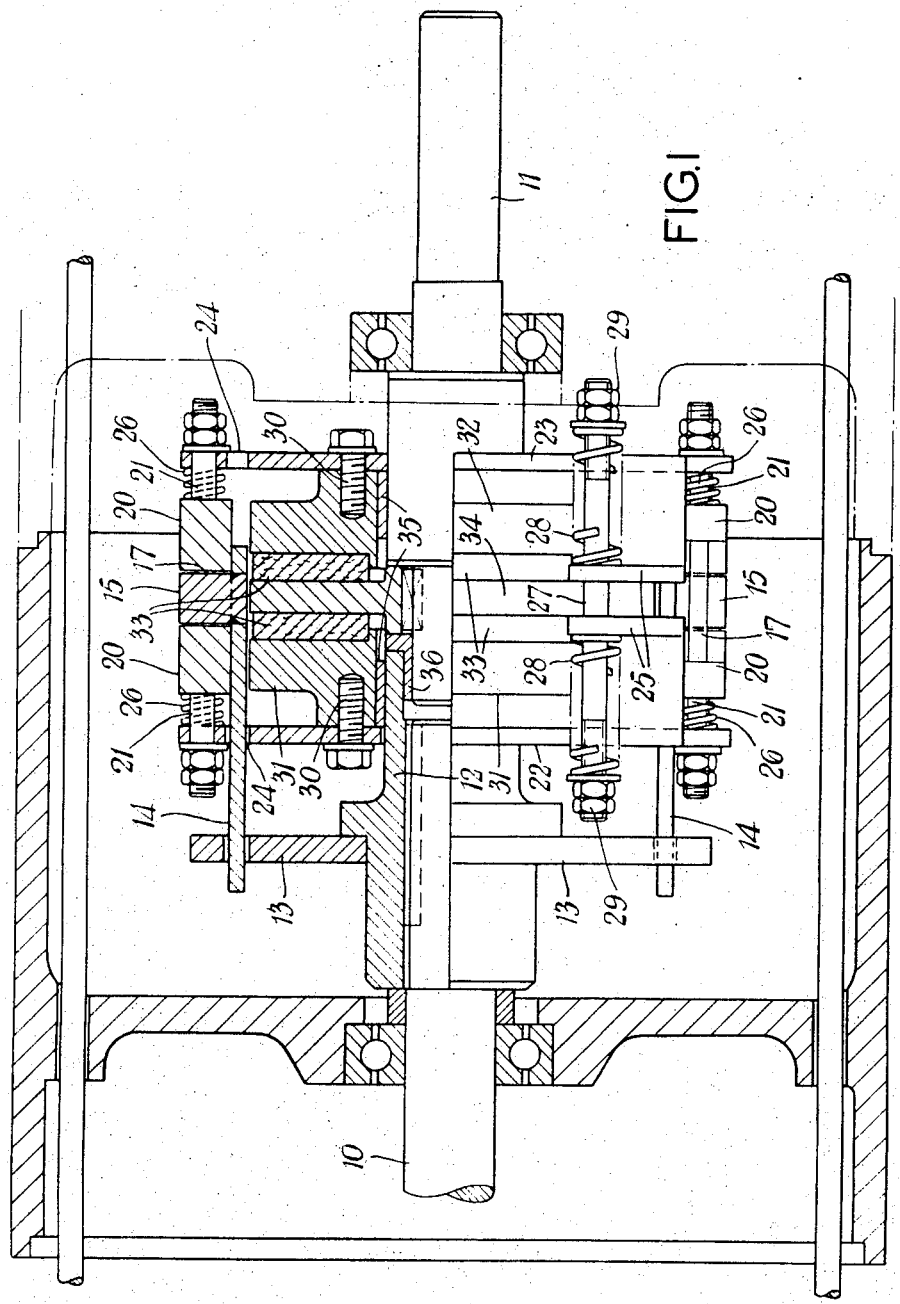
Figure 2:
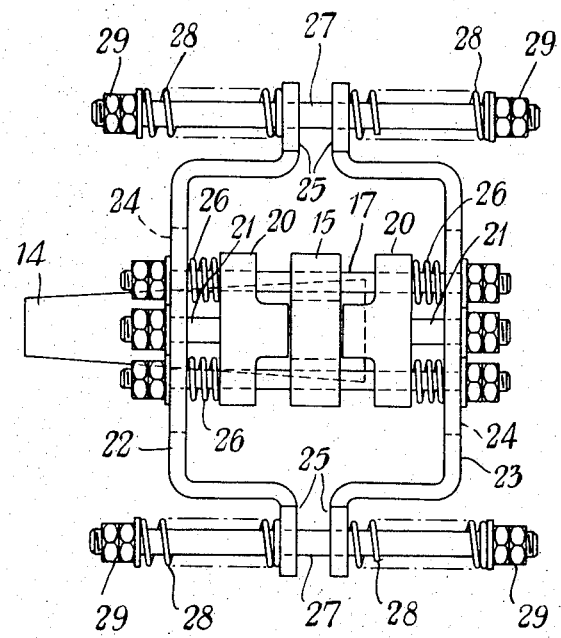
Figure 3:
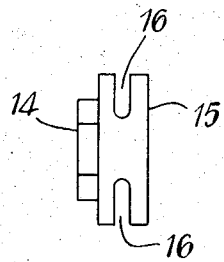

In order that the nature of the invention may be more readily understood reference will now be made to the accompanying drawings which show one possible constructional embodiment by way of example and in which:

FIGURE 1 is a part sectional side elevational view of a drive transmission mechanism, FIGURE 2 is a plan view of the mechanism shown in FIGURE 1, FIGURE 3 is an end view of a detail.

Referring now to the drawings 10 denotes a driving shaft e.g. the shaft of an electric motor, while 11 denotes a driven shaft axially aligned with said shaft 10. Keyed to the shaft 10 is a member including a sleeve like portion 12 and two radially directed arms 13 which latter are disposed in 180° relationship with respect to each other. At or adjacent its outer end each arm 13 is slotted to receive a member 14, such members which extend parallel to the axes of the shafts 10 and 11, each carrying a transversely extending piece 15. The piece 15 of each member 14 is as will be clearly seen from FIGURE 3 formed at its opposite ends with two slots 16 adapted to accommodate rods 17. Disposed at opposite sides of the piece 15 of each member 14 are two T-shaped elements each comprising a rectangular head portion 20 and a stem 21. As will be seen from FIGURES 1 and 2 the head portion 20 is formed in each case with a pair of apertures through which the aforesaid rods 17 pass. 22 and 23 denote two cage elements comprising two similar pressings each of which is, as will be seen from FIGURES 1 and 2 formed adjacent each of its two diametrically opposed ends with a transverse slot 24, the slots 24 in the pressing 22 being adapted to accommodate the respective members 14 with a degree of clearance sufficient to allow lateral movement of said members. The cage elements 22, 23 are additionally formed adjacent each end with a pair of stepped portions terminating in laterally directed tongues 25. As will be seen from FIGURES 1 and 2 each of the cage elements 22 and 23 is formed adjacent each end with three apertures, the central one being adapted to receive the outer end of the stem 21 of the appropriate T shaped element above referred to while the two outer ones are adapted to accommodate the end portions of the rods 17. Coiled compression springs 26 are disposed around the rods 17 such springs bearing in each case at one end against the head 20 of the appropriate T shaped element aforesaid and at the other against the appropriate cage elements 22, 23. It will be appreciated that there will in fact be eight springs 26 four in the upper and four in the lower spring assembly having regard to the way in which the mechanism is illustrated in FIGURE 1. As will be seen from FIGURE 2 each of the tongues 25 of the cage elements 22, 23 is formed with an aperture such apertures being designed to accommodate rods 27 of which there will in fact be four in number, two at the top spring assembly and two at the bottom spring assembly. Coiled compression springs 28 will be disposed on the rods 27 such springs bearing in each case at one end against the appropriate tongue 25 and at the other against lock nuts 29. As in the case of the springs 26, there will be in all eight springs 28, four at the top and four at the bottom. The nuts 29 will allow of adjustment of the degree of compression of the springs 28 and will therefore provide for a degree of adjustment of the drive transmission mechanism as will be later appreciated. From the foregoing and from the drawings it will be seen that the springs 28 tend to urge the cage elements 22 and 23 inwardly or towards each other while the springs 26 tend to urge the T shaped elements inwardly so that the head portions 20 thereof will bear against the respective pieces 15 of the members 14.

The cage elements 22 and 23 are affixed respectively, as by means of bolts 30 to disc like members 31 and 32 such latter members each carrying an annular pad 33 of friction material. As will be seen the pads 33 are disposed at opposite sides of a disc 34 which is keyed to the shaft 11. The construction above described is such that the pads 33 will be maintained in frictional engagement with the disc 34 at all times.

The disc like members 31, 32 are supported on self lubricating bushes 35 so that they will be capable of axial sliding movement. Similarly the end of the shaft 11 is supported in a self lubricating bush 36 located in the end of the sleeve like portion 12.

As indicated above, by virtue of the action of the springs 28 the friction pads 33 will be maintained in frictional engagement with the disc 34 at all times and when the drive transmitting mechanism is at rest the parts will assume the positions shown in FIGURES 1 and 2. When a drive is initially imparted to the driving shaft 10 the sleeve like portion 12 and the arms 13 will rotate with said shaft and will carry with them the members 14. On initial starting however the resistance to motion of the shaft 11 will be at a maximum and such resistance will result in a relative angular movement between the pieces 15 and the rods 17. This relative movement resulting from the resistance to motion of the driven parts will result in the T shaped elements being displaced relatively to each other with a subsequent increase in the compression of the springs 26. As a result of this added compression of the springs 26 the resultant force exerted by the springs 28 on the cage elements 22, 23 and hence on the disc like members 31, 32 to urge them inwardly or towards each other will be reduced. This will result in a reduction of the pressure or frictional engagement of the friction pads 33 with the disc 34 and hence slippage of the coupling and a reduction in the torque transmitted to the shaft 11. As the speed of the driven shaft 11 increases the angular displacement of the rods 17 relatively to the pieces 15 will decrease so that the T shaped elements will tend to return towards their initial position thereby progressively reducing the degree of compression of the springs 26. The resultant force exerted by the springs 28 on the cage elements 22, 23 will thus progressively increase so that there will be a progressive increase of pressure or frictional engagement of the friction pads 33 with the disc 34 and hence a progressive increase in the torque transmitted to the shaft 11. When the driven shaft 11 attains the speed of the driving shaft 10 the parts of the mechanism will again resume their initial positions illustrated in FIGURES 1 and 2.

A mechanism such as is indicated above will allow for smooth acceleration and also retardation in both directions of rotation of the driving shaft and under all conditions of operation. Furthermore while such mechanism is applicable particularly to drive units for imparting traverse motion to pulley blocks, cranes or the like it may nevertheless be applied to the drive unit of any equipment wherein it is necessary to arrange for smooth acceleration and/or retardation.

What I claim is:

1. A drive transmission mechanism interposed between aligned driving and driven shafts comprising:
    a disc operatively secured to one of the shafts for rotation therewith;
    friction gripping members juxtaposed each of the opposed faces of the disc and operatively carried by cage elements;
    a pair of cage elements, each operatively attached to one of the friction gripping members, and being operatively slidably connected to and rotatably keyed to the other shaft so as to be rotated thereby while being capable of relative axial movement with respect to the shafts and each other;
    resilient means bearing against the cage elements and urging the cage elements towards each other so that the friction gripping members will be maintained in frictional engagement with the disc; and
    camming means interposed between the cage elements for exerting a force on the cage elements opposed to that exerted by the resilient means whereby the degree of frictional engagement between the friction gripping members and the disc will be lessened to allow slippage when the torque between the driving and driven shafts exceeds a predetermined value so that smooth acceleration and retardation of the driven shaft will be obtained upon starting and stopping of the driving shaft.

2. The transmission mechanism defined in claim 1 in which the camming means interposed between the cage elements comprises at least one camming member positioned approximately parallel to and between the cage elements and movably mounted to allow limited angular displacement relative to the longitudinal axis of the shafts, whereby upon moving out of a parallel position between the cage elements, the member operatively abuts the opposed cage elements and cams them apart thus reducing the degree of frictional engagement between the friction gripping members and the disc.

3. The transmission mechanism defined in claim 2 additionally comprising rod means mounted through the cage elements and parallel to the driving and driven shafts, abutted members slidably mounted on the rods and positioned on opposite sides of the camming member, compression spring means mounted on the rod means between the abutted members and the cage elements whereby movement of the camming member causes it to cam the abutted members and the cooperating cage elements apart.

4. The transmission mechanism defined in claim 1 comprising a first pair of arms mounted transversely of said other shaft and extending in opposite directions therefrom, the first pair of arms being operatively connected to said other shaft so as to be rotatable therewith, a second pair of arms extending parallel to the shafts and mounted for limited angular displacement relative to the longitudinal axis of the shafts and each having one end received in the outer end of one of the first pair of arms, a camming member mounted on the other end of each of the second pair of arms for movement therewith thereby operatively camming the cage elements apart, and the cage elements having slots through which the second pair of arms pass, the slots being wider than the width of the second pair of arms to allow relative transverse movement therebetween.

5. The transmission mechanism defined in claim 4 comprising a sleeve member having the first pair of arms radially mounted thereon and the sleeve member being rotatably keyed to said other shaft.

References Cited

UNITED STATES PATENTS

| 3,100,974 | 8/1963 | Wilson et al. | 64—30 |
| 3,122,903 | 3/1964 | Ramsden | 64—30 |

FOREIGN PATENTS 430,562   6/1926   Germany.

FRED C. MATTERN, JR., *Primary Examiner.*

HALL C. COE, *Examiner.*